United States Patent
Mitsuma et al.

(10) Patent No.: US 11,914,883 B2
(45) Date of Patent: Feb. 27, 2024

(54) COPY FROM LTFS TO DISK

(71) Applicant: International Business Machines Corporation, Armonk, NY (US)

(72) Inventors: Shinsuke Mitsuma, Machida (JP); Tsuyoshi Miyamura, Yokohama (JP); Hiroshi Itagaki, Yokohama (JP); Tohru Hasegawa, Tokyo (JP); Noriko Yamamoto, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/653,556

(22) Filed: Mar. 4, 2022

(65) Prior Publication Data

US 2023/0280925 A1    Sep. 7, 2023

(51) Int. Cl.
*G06F 3/06* (2006.01)

(52) U.S. Cl.
CPC .......... *G06F 3/065* (2013.01); *G06F 3/0604* (2013.01); *G06F 3/0644* (2013.01); *G06F 3/0659* (2013.01); *G06F 3/0683* (2013.01)

(58) Field of Classification Search
CPC ...... G06F 3/065; G06F 3/0604; G06F 3/0644; G06F 3/0659; G06F 3/0683
See application file for complete search history.

(56) References Cited

U.S. PATENT DOCUMENTS

| | | |
|---|---|---|
| 7,007,129 B2 | 2/2006 | Sekine |
| 7,200,546 B1 | 4/2007 | Nourmohamadian |
| 7,302,540 B1 | 11/2007 | Holdman |
| 8,731,897 B2 | 5/2014 | Matze |
| 9,753,659 B2 | 9/2017 | Hasegawa |
| 10,168,920 B2 | 1/2019 | Abe |
| 10,545,698 B2 | 1/2020 | Hasegawa |
| 2008/0244205 A1 | 10/2008 | Amano |
| 2010/0185813 A1 | 7/2010 | Muroyama |
| 2010/0250229 A1 | 9/2010 | Matze |
| 2011/0040942 A1 | 2/2011 | Akirav |
| 2011/0276754 A1 | 11/2011 | Bish |
| 2012/0054428 A1* | 3/2012 | Butt ............... G06F 3/0686 711/111 |
| 2012/0310883 A1 | 12/2012 | Akirav |
| 2014/0108720 A1 | 4/2014 | Abe |
| 2014/0201424 A1 | 7/2014 | Chen |
| 2015/0012696 A1 | 1/2015 | Inai |
| 2015/0095566 A1 | 4/2015 | Itagaki |
| 2016/0041780 A1 | 2/2016 | Iwasaki |
| 2016/0092131 A1 | 3/2016 | Nakajima |

(Continued)

FOREIGN PATENT DOCUMENTS

JP    2013101506 A    5/2013

OTHER PUBLICATIONS

"AWS Black Belt online seminar 2017 Snowball", Jun. 14, 2017, 78 pages, <https://www.slideshare.net/AmazonWebServicesJapan/20170614-aws-blackbeltsnowball>.

(Continued)

*Primary Examiner* — Eric Cardwell
(74) *Attorney, Agent, or Firm* — Michael A. Petrocelli

(57) ABSTRACT

A copy operation is received. The copy operation is of one or more files stored on a linear tape file system. The copy operation is performed in a plurality of units of extents of the one or more files.

20 Claims, 4 Drawing Sheets

(56) References Cited

U.S. PATENT DOCUMENTS

| | | | |
|---|---|---|---|
| 2016/0283493 A1 | 9/2016 | Wideman | |
| 2016/0371151 A1 | 12/2016 | Masuda | |
| 2017/0052718 A1 | 2/2017 | Abe | |
| 2017/0147451 A1* | 5/2017 | Iwasaki | G06F 3/0685 |
| 2019/0310942 A1* | 10/2019 | Yamamoto | G11B 5/00817 |
| 2020/0319985 A1* | 10/2020 | Mitsuma | G06F 3/0686 |
| 2020/0341946 A1* | 10/2020 | Hasegawa | G06F 16/172 |

OTHER PUBLICATIONS

"Cloud Gateway LTFS", © Copyright 2018 Storeasy S.R.L., 10 pages, <https://www.storeasy.cloud/cloud-gateway-ltfs/>.

"File system fragmentation", Wikipedia, Last edited on Jun. 7, 2020, 6 pages, <https://en.wikipedia.org/wiki/File_system_fragmentation>.

"Linear Tape File System (LTFS) Format Specification", Version 2.5, May 19, 2019, 97 pages, <https://www.snia.org/tech_activities/standards/curr_standards/ltfs>.

"LTFS Bulk Transfer", Version 1.0, Oct. 11, 2016, 41 pages, <https://www.snia.org/tech_activities/standards/curr_standards/Itfs>.

"LTFS Copy Tool functions", Aug. 26, 2020, 2 pages, <https://www.ibm.com/docs/en/spectrum-archive-le?topic=tool-ltfs-copy-functions>.

"Transfer Appliance", Downloaded Jan. 18, 2022, 7 pages, <https://cloud.google.com/transfer-appliance/>.

Disclosed Anonymously, "A method to reduce seek time of tape storage layer in HSM by using short and long media", An IP.com Prior Art Database Technical Disclosure, IP.com No. IPCOM000248096D, IP.com Electronic Publication Date: Oct. 26, 2016.

"IBM LTFS Copy Tool", IBM Documentation, Oct. 25, 2021, 2 pages, <https://www.ibm.com/docs/en/spectrum-archive-le?topic=tools-ltfs-copy-tool>.

Levens, Skip, "Moving Tape Content to Backblaze Fireball with Canister," Backblaze, Sep. 6, 2018, 7 pages, <https://www.backblaze.com/blog/moving-tape-content-to-cloud-storage/>.

"How FAT Works", Oct. 8, 2009, 26 pages, <https://docs.microsoft.com/en-us/previous-versions/windows/it-pro/windows-server-2003/cc776720(v=ws.10)>.

Mitsuma et al., "Copying Data From a Linear Tape File System (LTFS)-Based Storage System to a Random Access Nonvolatile Memory (RANVM) Drive in Units of Blocks of the Drive", U.S. Appl. No. 17/108,936, filed Dec. 1, 2020, 67 pages.

Mitsuma et al., "Duplexing File System Data", U.S. Appl. No. 14/832,213, filed Aug. 21, 2015, 34 pages.

"AWS Snowball", © 2020, Amazon Web Services, Inc., last retrieved from internet Aug. 26, 2020, 20 pages, <https://aws.amazon.com/snowball/?whats-new-cards.sort-by=item.additionalFields.postDateTime&whats-new-cards.sort-order=desc>.

"Migrating data from tape to DISK or FILE devices," IBM Knowledge Center, last retrieved from Internet Nov. 9, 2020, 3 pages, <https://www.ibm.com/support/knowledgecenter/SSGSG7_7.1.0/com.ibm.itsm.srv.upgrd.doc/t_xplat_mig_data_frm_tape.html>.

"Rolling back media", IBM Knowledge Center, last retrieved from Internet Dec. 1, 2020, 4 pages, <https://www.ibm.com/support/knowledgecenter/STQNYL_2.4.1/ltfs_rolling_back_media_win.html>.

\* cited by examiner

COPY FROM LTFS TO DISK

BACKGROUND

The present invention relates generally to the field of linear tape file systems (LTFS), and more particularly to efficient copying of data from LTSF to disk storage in units of extents.

A LTFS is a file system that stores data on one or more magnetic tape. In a LTFS, data is stored on a magnetic tape in a sequential nature of the tape. Files are appended to the end of the tape. If a file is to be modified and overwritten or the file is removed from a volume on the magnetic tape, the associated tape blocks where the file was originally written are marked as unavailable and the used data storage is generally not recovered. LTFS may have search times that can range from 10 to 100 seconds as the magnetic tape is advanced to the proper location before data can be read.

SUMMARY

Embodiments of the present invention disclose a computer-implemented method, a computer program product and a system for a copying operation. In one embodiment, a copy operation is received. The copy operation is of one or more files stored on a linear tape file system. The copy operation is performed in a plurality of units of extents of the one or more files.

DETAILED DESCRIPTION

Embodiments of the present invention recognize that data migration from an on-premises environment, such a LTFS, to a cloud based environment, such as an HDD, exist. Embodiments of the present invention recognize that transferring a large amount of data is crucial. LTFS simplifies tape handling in comparison with conventional methods, though the feature of using a tape as a storage device remains the same. When reading a file from a hard disk drive (hereinafter referred to as HDD) and a magnetic storage device such as tape, a device (head) to read data needs to be adjusted to be in a position in which file data is stored (this operation is called seek). Seek operation in HDD takes no more than several tens of milliseconds at the maximum by simply moving an arm to which a head is attached on a disk with a diameter of several centimeters, whereas seek operation on a tape takes about 100 seconds at the maximum because of the necessity of rewinding the tape amounting to approximately 1000 meters. When copying a large number of files from LTFS to HDD, it is accompanied by occurrence of a significant number of seek operations and requiring extremely long time. Embodiments of the present invention seek to prevent occurrence of redundant seek operations when copying files on LTFS to HDD.

Embodiments of the present invention provide for a system to copy data using a LTFS to HDD using units of extents. Embodiments of the present invention provide for a system to copy data using an extent reverse lookup table.

Figure 1:
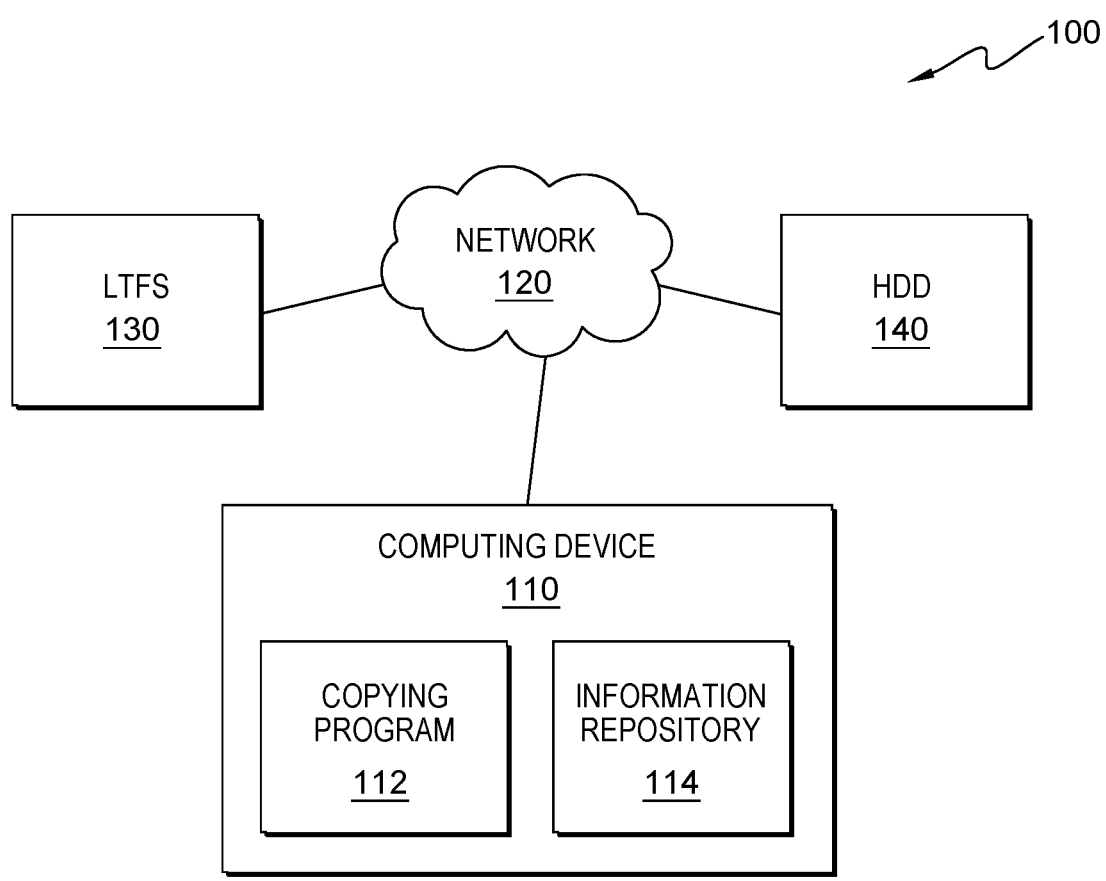
FIG. 1 is a functional block diagram of a network computing environment, generally designated 100, suitable for operation copying program 112, in accordance with at least one embodiment of the invention.

Referring now to various embodiments of the invention in more detail, FIG. 1 is a functional block diagram of a network computing environment, generally designated 100, suitable for operation of copying program 112, in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims. It should be noted, copying program 112 is being discussed as a single program for simplicity. However, steps of workflow 300 of copying program 112 may be performed by other hardware/software in computing device 110.

Network computing environment 100 includes computing device 110, LTFS 130, and HDD 140, interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Network computing environment 100 includes computing device 110. In an embodiment, computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g., database server computers, application server computers, web servers, and media servers) that act as a single pool of seamless resources when accessed within network computing environment 100.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes copying program 112 and information repository 114.

Embodiments of the present invention provide for a copying program 112 for copying data from LTFS 130 to HDD 140 using units of extents. In an embodiment, copying program 112 receives a copy operation. In an embodiment, copying program 112 obtains an extent reverse lookup table. In an embodiment, copying program 112 determines whether there are unprocessed extents. In an embodiment, copying program 112 reads metadata of the next unprocessed extent. In an embodiment, copying program 112 determines whether the destination file exists. In an embodiment, copying program 112 creates the destination file. In an embodiment, copying program 112 reads the data. In an embodiment, copying program 112 writes the data.

In an embodiment, computing device 110 includes information repository 114. In an embodiment, information repository 114 may be managed by copying program 112. In an alternative embodiment, information repository 114 may be managed by the operating system of computing device 110, another program (not shown), alone, or together with, copying program 112. Information repository 114 is a data repository that can store, gather, and/or analyze information. In an embodiment, information repository 114 is stored on computing device 110. In some embodiments, information repository 114 may reside on another computing device (not shown), provided information repository 114 is accessible by computing device 110. In an embodiment, information repository 114 may include data, including, but not limited to, information about data stored on LTFS 130, data stored on HDD 140, and one or more extent reverse lookup tables. In an embodiment, the extent reverse lookup tables may include one or more unit of extents associated with data found on the LTFS 130. In an embodiment, the extent reverse lookup tables may include a file number, a start block, a byte offset, a byte count, or a file offset for each unit of extent found in the extent reverse lookup table.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Network computing environment 100 includes linear tape file system (LTFS) 130. In an embodiment, LTFS 130 stores data/files in LTFS 130 using units of extents. In an embodiment, a file may be a single unit of extent. In an alternative embodiment, a file may consist of two or more unit of extents. In an embodiment, unit of extents of a file do not have to be in order and a unit of extent of a second file may be found between a first unit extent of a first file and a second unit of extent of a second file in the linear order of the LTFS 130 storage system. In one embodiment, LTFS 130 is a tape storage library interconnected with a host (e.g., a tape library mainframe, a client computer, etc.), such as computing device 110, but could be any other host (not shown). In one embodiment, LTFS 130 provides the capability to store data through the use of an integrated tape drive, such as tape drive (not shown), and one or more magnetic tape cartridges, such as tape media (not shown). In one embodiment, a tape library may represent a plurality of interconnected physical tape libraries. In one embodiment, a plurality of tape library frames (not shown) can be interconnected to form one or more tape libraries. In one embodiment, one or more tape libraries can be organized into a plurality of columns evenly spaced within a floor space (i.e., a designated space within, for example, a physical structure). In another embodiment, one or more tape library frames may be stacked atop one or more tape libraries organized into the plurality of columns to satisfy growth demands of big data tape management, within an existing floor space, by effectively building up, as opposed to building out. In one embodiment, LTFS 130 includes a tape gripper (not shown) for retrieving one or more tape cartridges, such as tape media, from a plurality of tape cartridge storage slots (not shown) within one or more interconnected tape library frames (not shown) designated for tape storage and inserting the one or more tape cartridges into a tape drive (i.e., mount) for read/write operations.

In one embodiment, a tape drive is a data storage device for executing read and write information on one or more tape cartridges. In one embodiment, the tape drive is arranged in a column within a tape library frame of a tape library, such as LTFS 130. In one embodiment, the tape drive and one or more tape cartridges, such as tape media, are stored separately within a tape library frame, or within a tape library, such as LTFS 130, that includes one or more tape library frames (i.e., tape media is stored separately from tape drive, in one or more tape library frames dedicated for tape media storage). In one embodiment, a tape library, such as LTFS 130, includes a plurality of tape drives for executing read and write information on the one or more tape cartridges.

In an alternative embodiment, the tape drive includes one or more integrated programs (not shown), such as a migration program (not shown), a primary storage device (not shown) and a secondary storage device (not shown) for receiving, from a host, a command to check whether data to be migrated can be written during movement of a head for reading data to be recalled. In the alternative embodiment, upon receiving the command, the tape drive, determines whether a write start position is between a current head position and a read start position, and a direction of movement to the read start position is the same as a direction of movement in writing. In the alternative embodiment, when a write start position is between a current head position and a read start position, and a direction of movement to the read start position is the same as a direction of movement in writing, the tape drive responds to a host that the data to be migrated can be written together with a writable size. In the alternative embodiment, the tape drive reads data to be recalled from the read start position after writing data to be migrated transmitted from the host as a reply to the respond.

In one embodiment, tape media is a magnetic tape cartridge capable of storing data within a tape library, such as LTFS 130. In one embodiment, tape media may be high-density magnetic tape media capable of storing digital information within a tape library, such as LTFS 130. In one embodiment, one or more tape cartridges may be stored within a high-density storage slot (not shown) within LTFS 130, where the high-density storage slot is capable of storing up to five tape cartridges stacked in a row within a single slot space within a tape library frame (not shown) of LTFS 130. In one embodiment, tape media may be linear tape open (LTO) tape cartridges. In another embodiment, tape media may be enterprise tape cartridges. For example, high-density storage slots are capable of storing up to five tape cartridges in a tiered orientation, with a tier 5 position on linear tape open (LTO) tape cartridges being a first tape cartridge loaded into the slot (rear-most tape cartridge on a depth side of a tape library frame), and a tier 1 position being a last tape cartridge loaded into the slot (forward-most tape cartridge on a front side of a tape library frame). Where a tier 5 position LTO tape cartridge is requested, the LTO tape cartridges forward of it (up to four cartridges), need to be removed in order to access the requested LTO tape cartridge. In alternative embodiments, high-density storage slots, are capable of storing up to four tape cartridges in a tiered orientation, with a tier 4 position on enterprise tape cartridges being a first tape cartridge loaded into the slot (rear-most tape cartridge), and a tier 1 position being a last tape cartridge loaded into the slot (forward-most tape cartridge). Where a tier 4 position enterprise tape cartridge is requested, the enterprise tape cartridges forward of it (up to three cartridges), need to be removed in order to access the requested enterprise tape cartridge. However, it should be appreciated that embodiments of the present invention may be practiced with a tape library having any number or type of tape media capable of being stored in any number of tiered positions within a high-density storage slot.

Network computing environment 100 includes hard disk drive (HDD) 140. HDD 140 may be implemented using any volatile or non-volatile storage media for storing information, as known in the art. For example, HDD 140 may be implemented with an optical library, one or more independent hard disk drives, multiple hard disk drives in a redundant array of independent disks (RAID), solid-state drives (SSD), or random-access memory (RAM). In an embodiment, HDD 140 may be part of a cloud computing environment. Similarly, information repository 114 may be implemented with any suitable storage architecture known in the art, such as a relational database, an object-oriented database, or one or more tables.

Figure 2:
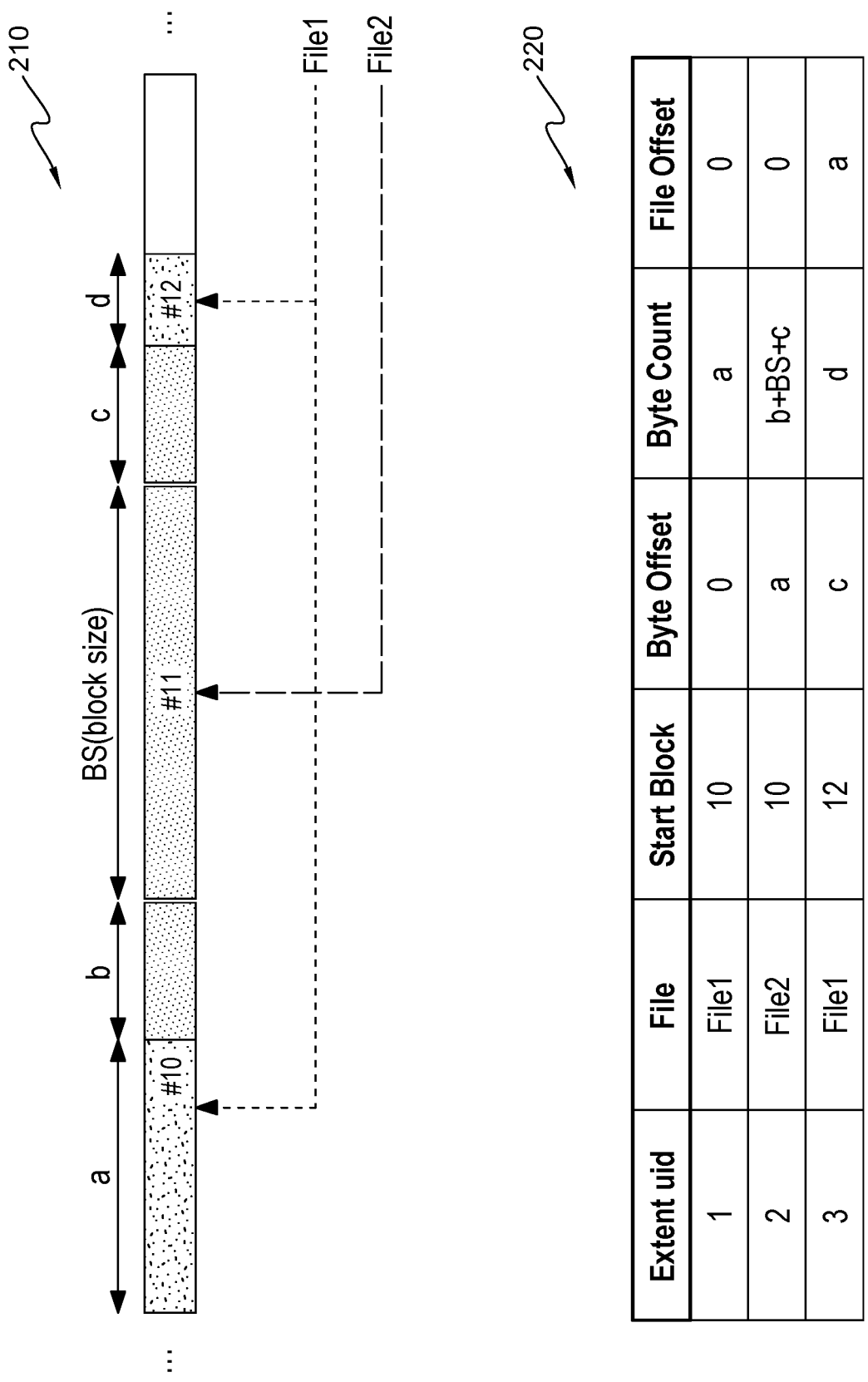
FIG. 2 is an example of fragmented files in a LTFS and the corresponding extent reverse lookup table, in accordance with at least one embodiment of the invention.

FIG. 2 is an example 210 of fragmented files in a LTFS 130 and the corresponding extent reverse lookup table 220 stored in information repository 114, in accordance with at least one embodiment of the invention. As shown in FIG. 2, example 210 includes File1 and File2. File 1 is spread between block #10 and block #12. File 2 is spread between block #10, block #11, and block #12. In a LTFS 130, data is managed by providing positions of data according to a list of extents, wherein one extent represents a single continuous piece of data. In an embodiment, each extent consists of a start block number (Start Block), a start offset in the block (Byte Offset), a length of continuous data (Byte Count), and a position of the extent in a file (File Offset). For example, as show in in FIG. 2, File1 and File2 are stored on blocks #10, #11, and #12. File2 is data recorded as a single extent. File1 is data recorded as two extents, which may, for example, be due to data of File2 being written at the same time as data of File1.

As shown in FIG. 2, there an extent reverse lookup table 220 describing the data in the example 2. In the extent reverse lookup table 220, the three extents noted above are shown. In this example, extent uid #1 is for File1, has a start block of block #10, a byte offset of 0, meaning File1 exists at the beginning of block #10, has a byte count of a, and a file offset of 0. In this example, extent uid #2 is for File2, has a start block of block #10, a byte offset of a, a byte count of (a+BS+c), where BS is a block size, and a file offset of 0. In this example, extent uid #3 is for File1, has a start block of block #12, a byte offset of c, a byte count of d, and a file offset of a. The file offset for extent uid #3 indicates that there is a previous extent uid that includes the earlier part of File1, which is sized as a. In an embodiment, the extent reverse lookup table 220 is ordered by extent uid number and these uid numbers are sorted by the order of where the extents are ordered in block positions on the LTFS 130. In an embodiment, each extent uid number is associated with metadata of a file to which the extent belongs. In an embodiment, this association depends on the implementation of LTFS 130 and since metadata in all files in each volume of the LTFS 130 are held by a memory in a generic implementation of LTFS 130, the association can be implemented by using a pointer, array index arrangement, etc. In an embodiment, the extent reverse lookup table 220 can be created by sorting extents of all files as a list based on the index of the LTFS 130. In an embodiment, extent reverse lookup table 220 is updated when the index of the LTFS 130 is updated. In an embodiment, when writing the LTFS 130 index to a tape in LTFS 130, the extent reverse lookup table 220 may be created and/or updated and written as a file in a position immediately before the index in the tape or written to information repository 114. It should be noted, the variables "a, b, c, d, BS" are numerical values, and the variables are used throughout discussion for simplicity.

Figure 3:
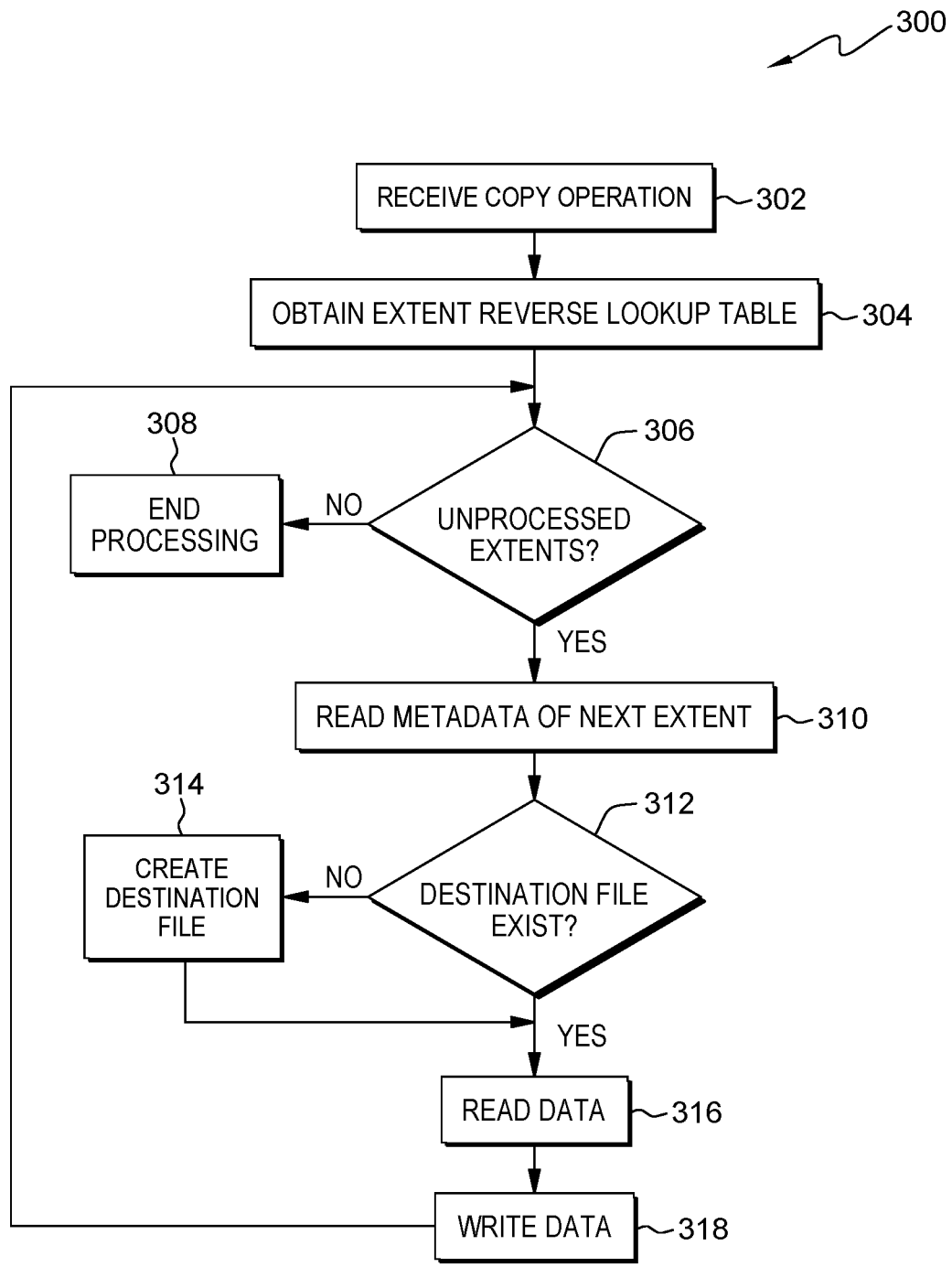
FIG. 3 is a flow chart diagram depicting operational steps for copying program 112 for copying data from LTFS to Disk using units of extents, in accordance with at least one embodiment of the invention.

FIG. 3 is a flow chart diagram of workflow 300 depicting operational steps performed by copying program 112 for copying data from LTFS 130 to HDD 140 using units of extents, in accordance with at least one embodiment of the invention. In an alternative embodiment, the steps of workflow 300 may be performed by any other program (not shown) while working with copying program 112. It should be appreciated that embodiments of the present invention provide at least for copying data from LTFS 130 to HDD 140. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, copying program 112 can invoke workflow 300 upon receiving an indication from a user, via the user interface of computing device 110, of an instruction for copying data from LTFS 130 to HDD 140.

Copying program 112 receives a copy operation (step 302). At step 302, copying program 112 receives an indication of a copy operation of one or more files from LTFS 130 to HDD 140. In an embodiment, copying program 112 may receive this indication from a user, via the user interface of computing device 110. In another embodiment, copying program 112 may receive this indication from another computing device (not shown) via network 120. For example, the copy operation may be File 1 and File2 from the extent reverse lookup table 220 discussed above in step 302 to be copied from LTFS 130 to HDD 140.

Copying program 112 obtains an extent reverse lookup table (step 304). At step 304, copying program 112 obtains an extent reverse lookup table that is related the files involved in the copy operation discussed in step 302. In an embodiment, copy program 112 may obtain the extent reverse lookup table from the LTFS 130 by querying LTFS 130 for the extent lookup table. In an embodiment, copy program 112 may access information repository 114 to obtain the extent reverse lookup table. In an embodiment, copying program 112 determines the extents, or also known as units of extents, from the extent reverse lookup table, that are associated with the copy operation. For example, the copy operation involving File1 and File2 discussed above in step 302 involves extent uid #1, #2, and #3. In an embodiment, all extents in the extent reverse lookup table are part of the copy operation. In an alternative embodiment, only some of the extents in the extent reverse lookup table are part of the copy operation.

Copying program 112 determines whether there are unprocessed extents (decision step 306). In other words, copying program 112 determines whether any files in the copy operation of step 302 have any associated extents, as found in step 304, that have not been transferred from the source of the copy operation, LTFS 130, to the destination of the copy operation, HDD 140. In an embodiment, processing of extents by copying program 112 proceeds in order form lowest (i.e. extent uid #1) to highest (i.e. extent uid #3) using the example discussed above. In an embodiment, processing is the action of copying, or sending a copy indication to the source (i.e. LTFS 130), from the source to the destination. In an embodiment, if copying program 112 determines there are unprocessed extents, (decision step 306, yes branch), processing proceeds to step 310. In an embodiment, if copying program 112 determines there are no unprocessed extents (decision step 306, no branch), processing proceeds to step 308. Continuing the example discussed above, if this is the first extent to be processed, copying program 112 will determine that extent uid #1 has not been processed yet, therefore processing proceeds to step 310. In another version of this example, if this is the second extent to be processed, copying program 112 will determine extent uid #1 has been processed but extent uid #2 has not been processed yet, therefore processing proceeds to step 310. In yet another version of this, if copying program 112 has determined extent uid #3 has been processed, therefore no unprocessed extents exist, and processing proceeds to step 308.

Copying program 112 ends processing (step 308). At step 308, copying program 112 ends processing. In an embodiment, copying program 112 may transmit an indication that the copy operation has finished. For example, copying program 112 may indicate, via the user interface of computing device 110, that the copy operation has completed.

Copying program 112 reads metadata of next extent (step 310). At step 310, copying program 112 determines metadata of the next extent to be processed from the extent reverse lookup table. In an embodiment, the metadata includes, but is not limited to, the extent uid #, file, start block, byte offset, byte count, and file offset.

Copying program 112 determines whether the destination file exists (decision step 312). At decision step 312, copying program 112 determines whether the destination file associate with the current extent uid #exists in the destination location, HDD 140. In an embodiment, copying program 112 may know of all files stored in HDD 140. In an alternative embodiment, copying program 112 may query HDD 140 to determine if the file exists in HDD 140. In an embodiment, if copying program 112 determines the destination file exists, (decision step 312, yes branch), processing proceeds to step 316. In an embodiment, if copying program 112 determines the destination file does not exist (decision step 312, no branch), processing proceeds to step 314. In an embodiment, copying program 112 also determines that HDD 140 does not already include a file with the same name as the file being moved from LTFS 130. In this scenario, processing ends, and copying program 112 notifies the user, via a user interface of copying program, or the device initializing the copying operation of the failed copy operation and the reason for the failure (i.e. the file already exists with the same name).

Copying program 112 creates the destination file (step 314). In an embodiment, copying program 112 creates the destination file in HDD 140 for the extent uid #being copied. In an alternative embodiment, copying program 112 may indicate to another program or to HDD 140 directly to create the destination file for the extent uid #being copied. For example, if extent uid #1 is being copied, and File1 does not exist in HDD 140, copying program 112 creates File1 on HDD 140.

Copying program 112 reads the data (step 316). At step 316, copying program 112 reads the data being copied based on the metadata determined in step 310. In an embodiment, copying program 112 reads the data and the data may be stored locally, in other words on computing device 110, before writing the data (step 318) to HDD 140. In an alternative embodiment, copying program 112 reads the data and the data is directly transferred to HDD 140, via network 120, for writing the data (step 318) to HDD 140. Continuing the example discussed above, if Extent uid #1 is being read, data that is "a" bytes long is read from the beginning of File1 at the byte offset from the start of block 10.

Copying program 112 writes data (step 318). In other words, copying program 112 writes the read data from step 316 to the file existing in HDD 140. In an embodiment, copying program 112 may write the data on HDD 140. In an alternative embodiment, copying program 112 may indicate to another program (not shown) found on computing device 110 or HDD 140 to write the data to HDD 140. Continuing the example above, copying program 112 writes "a" bytes to File1 on HDD 140. In an embodiment, after the write is completed, the File1 in HDD 140 is "closed" and the file can be "opened" again if more data of File1 needs to be written to HDD 140 in a later loop of workflow 300.

A brief summary example, including similarities to examples shown above, is discussed below. The brief summary example shows how copying of data from LTFS to HDD was done previously and how copying of data from LTFS to HDD is done now.

In the case of using the conventional art to copy data in units of files, a procedure to copy File1 and File2 from the tape to HDD is as follows: (1) Decide that files are copied in the order of File1 and File2 by comparing positions of head blocks of these files; (2) Create File1 in a destination file system (hereinafter referred to as File1-Dest); (3) Seek to the block #10; (4) Read the block #10 and write "a" bytes counted from the beginning to File1-Dest; (5) Seek to the block #12; (6) Read the block #12 and append "d" bytes counted after the offset c to File1-Dest; (7) Close File1-Dest; (8) Create File2 in the destination file system (hereinafter referred to as File2-Dest); (9) Seek to the block #10; (10) Read the blocks #10, #11, and #12 and write (b+BS+c) bytes counted after the offset a to File2-Dest; and (11) Close File2-Dest. As stated above, the conventional art involves occurrence of seek operation at (3), (5), and (9).

The present invention copies data in units of extents to eliminate these seek operations. To realize efficient copy in units of extents, the present invention prepares a list of extents sorted out in the order of block positions, as previously discussed as the reverse extent lookup table. Each entry in the extent reverse lookup table is associated with metadata of a file to which each extent belongs. This association depends on implementation of LTFS. Since metadata in all files in each volume are held by a memory in generic implementation of LTFS, the association can be implemented by using pointer or array index arrangement, etc. The extent reverse lookup table can be created by collectively sorting extents of all files as a list based on LTFS index. However, time spent for creating the extent reverse lookup table increases as the number of files becomes larger so that it is desirable to update the extent reverse lookup table whenever an extent in the LTFS index is updated. When writing LTFS index to a tape, by devising the manner of writing the extent reverse lookup table as a file in a position immediately before the index in the tape, time spent for creating an extent reverse lookup table again in the next mounting can be saved. The present invention extends LTFS so that an application for reading files from LTFS can obtain the extent reverse lookup table entirely or partially. Although it does not matter which interface should allow an application to obtain the extent reverse lookup table from LTFS, one possible example is use of a method to prompt LTFS to write an extent reverse lookup table for the portion matching file conditions in a designated path name when an application writes conditions of a file to read (e.g., list of wild cards) and a name of path (other than LTFS) to receive an extent reverse lookup table as a file to LTFS virtual extended attributes.

A procedure to make an application copy File1 and File2 from a tape to HDD in units of extents according to the present invention is as follows: a) The application obtains an extent reverse lookup table and plans the order of extents to copy. b) Processing of first extent (Extent uid=1): The application recognizes from the obtained extent reverse lookup table that the extent has "a" bytes counted from the beginning of File1, and creates File1-Dest as a destination to write the file data in a destination file system. c) The application requests LTFS to read the extent (i.e., read "a" bytes from the beginning of File1), and in response to the request, LTFS seeks to the block #10 and reads "a" bytes from the beginning of the block #10 to forward to the application. d) The application writes "a" bytes having been read to the beginning of File1-Dest and closes File1-Dest. e) Processing of subsequent extent (Extent uid=2): The application recognizes from the obtained extent reverse lookup table that the extent has (b+BS+c) bytes counted from the beginning of File2, and creates File2-Dest as a destination to write the file data in the destination file system. f) The application requests LTFS to read the extent (i.e., read (b+BS+c) bytes from the beginning of File2), and LTFS having read the block #10 already further reads the blocks #11 and #12 and transfers (b+BS+c) bytes after the offset a of the block #10 to the application. g) The application writes (b+BS+c) bytes having been read to the beginning of File2-Dest and closes File2-Dest. h) Processing of subsequent extent (Extent uid=3): The application recognizes from the obtained extent reverse table that the extent has "d" bytes from the offset a of File1, and opens File1-Dest having been created at (b). i) The application requests LTFS to read the extent (i.e., read "d" bytes counted from the offset a of File1), and LTFS having read the block #12 already transfers "d" bytes counted from the offset c of the block #12 to the application. j) The application seeks and writes "d" bytes having been read to the offset a of File1-Dest and closes File1-Dest. As stated above, the seek operation occurring at (5) and (9) in the conventional art can be eliminated. Instead, even though seek operation in File1-Dest occurs at (j), time spent for seek operation in HDD is overwhelmingly shorter than seek operation in the tape, as stated above.

Figure 4:
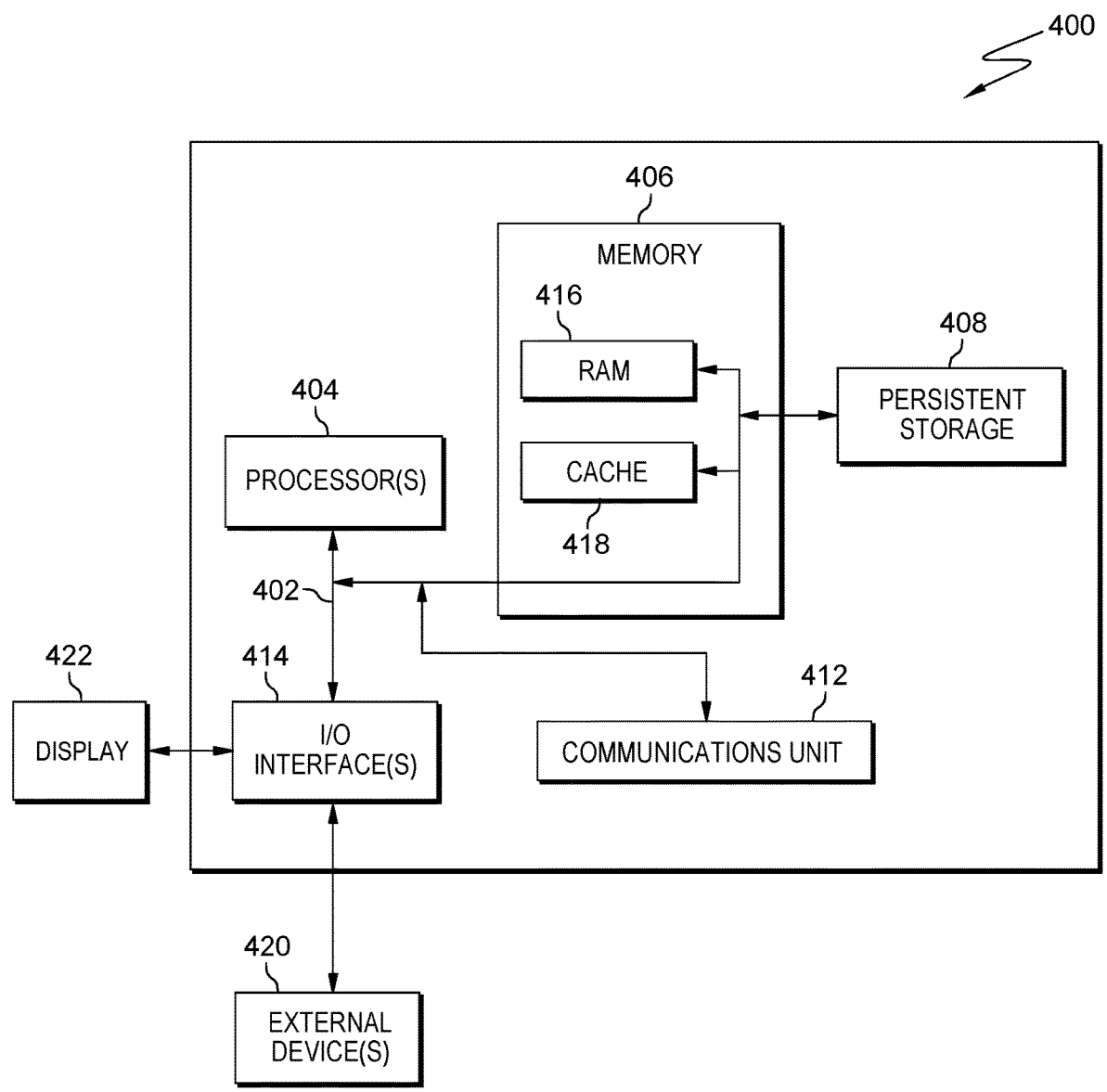
FIG. 4 is a block diagram depicting components of a computer, generally designated 400, suitable for executing copying program 112, in accordance with at least one embodiment of the invention.

FIG. 4 is a block diagram depicting components of a computer 400 suitable for copying program 112, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions for copying program 112 may be stored in the persistent storage 408, or more generally, any computer readable storage media, for execution by one or more of the respective computer processors 404 via one or more memories of the memory 406. The persistent storage 408 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for a copying operation, the computer-implemented method comprising:
   receiving, by one or more computer processors, a copy operation, wherein the copy operation is of one or more files stored on a linear tape file system;
   generating, by the one or more computer processors, an extent reverse lookup table for the one or more files by organizing unit of extents corresponding to the one or more files as a list of units of extents using an index of the linear tape file system, the list of units of extents being sorted out in an order of block positions on the linear tape file system;
   determining, by the one or more computer processors, a next unprocessed unit of extent;
   reading, by the one or more computer processors, metadata of the next unprocessed unit of extent from the extent reverse lookup table; and
   performing, by the one or more computer processors, the copy operation in units of extents of the one or more files based on the extent reverse lookup table.

2. The computer-implemented method of claim 1, wherein one extent represents a single continuous piece of data, and each entry in the extent reverse lookup table is associated with metadata of a file to which each extent belongs.

3. The computer-implemented method of claim 1, wherein the extent reverse lookup table is a plurality of units of extents related to the one or more files in order of the one or more files on the linear tape file system.

4. The computer-implemented method of claim 1, wherein the extent reverse lookup table includes a file number, a start block, a byte offset, a byte count, and a file offset for each unit of extent of the plurality of units extents.

5. The computer-implemented method of claim 1, wherein performing, by one or more computer processors, the copy operation in units of extents of the one or more files based on the extent reverse lookup table further comprises:
   indicating, by the one or more computer processors, to read a file associated with the next unprocessed unit of extent based on the metadata; and
   indicating, by the one or more computer processors, to write the file associated with the next unprocessed unit of extent.

6. The computer-implemented method of claim 1, wherein the copy operation is from the linear tape file system to a hard disk drive.

7. The computer-implemented method of claim 1, wherein the copy operation reads a block storing data of a file from the linear tape file system based on the extent reverse lookup table.

8. A computer program product for a copying operation, the computer program product comprising:
   one or more computer readable storage media; and
   program instructions stored on the one or more computer readable storage media, the program instructions comprising:
      program instructions to receive a copy operation, wherein the copy operation is of one or more files stored on a linear tape file system;
      program instructions to generate an extent reverse lookup table for the one or more files by organizing unit of extents corresponding to the one or more files as a list of units of extents using an index of the linear tape file system, the list of units of extents being sorted out in an order of block positions on the linear tape file system;
      program instructions to determine a next unprocessed unit of extent;
      program instructions to read metadata of the next unprocessed unit of extent from the extent reverse lookup table; and
      program instructions to perform the copy operation in units of extents of the one or more files based on the extent reverse lookup table.

9. The computer program product of claim 8, wherein one extent represents a single continuous piece of data, and each entry in the extent reverse lookup table is associated with metadata of a file to which each extent belongs.

10. The computer program product of claim 8, wherein the extent reverse lookup table is a plurality of units of extents related to the one or more files in order of the one or more files on the linear tape file system.

11. The computer program product of claim 8, wherein the extent reverse lookup table includes a file number, a start block, a byte offset, a byte count, and a file offset for each unit of extent of the plurality of units extents.

12. The computer program product of claim 8, wherein the program instructions to perform the copy operation in units of extents of the one or more files based on the extent reverse lookup table comprises:
   program instructions to indicate to read a file associated with the next unprocessed unit of extent based on the metadata; and
   program instructions to indicate to write the file associated with the next unprocessed unit of extent.

13. The computer program product of claim 8, wherein the copy operation is from the linear tape file system to a hard disk drive.

14. The computer program product of claim 8, wherein the copy operation reads a block storing data of a file from the linear tape file system based on the extent reverse lookup table.

15. A computer system for a copying operation, the computer system comprising:
   one or more computer processors;
   one or more computer readable storage media; and program instructions, stored on the one or more computer readable storage media for execution by at least one of the one or more computer processors, the program instructions comprising:
- program instructions to receive a copy operation, wherein the copy operation is of one or more files stored on a linear tape file system;
- program instructions to generate an extent reverse lookup table for the one or more files by organizing unit of extents corresponding to the one or more files as a list of units of extents using an index of the linear tape file system, the list of units of extents being sorted out in an order of block positions on the linear tape file system;
- program instructions to determine a next unprocessed unit of extent;
- program instructions to read metadata of the next unprocessed unit of extent from the extent reverse lookup table; and
- program instructions to perform the copy operation in units of extents of the one or more files based on the extent reverse lookup table.

16. The computer system of claim 15, wherein one extent represents a single continuous piece of data, and each entry in the extent reverse lookup table is associated with metadata of a file to which each extent belongs.

17. The computer system of claim 15, wherein the extent reverse lookup table is a plurality of units of extents related to the one or more files in order of the one or more files on the linear tape file system.

18. The computer system of claim 15, wherein the extent reverse lookup table includes a file number, a start block, a byte offset, a byte count, and a file offset for each unit of extent of the plurality of units extents.

19. The computer system of claim 15, wherein the program instructions to perform the copy operation in units of extents of the one or more files based on the extent reverse lookup table comprises:
- program instructions to indicate to read a file associated with the next unprocessed unit of extent based on the metadata; and
- program instructions to indicate to write the file associated with the next unprocessed unit of extent.

20. The computer system of claim 15, wherein the copy operation is from the linear tape file system to a hard disk drive.

* * * * *